Nov. 9, 1937.  A. GEORGIEV  2,098,745
ELECTROLYTIC CONDENSER
Filed Sept. 2, 1932   2 Sheets-Sheet 1
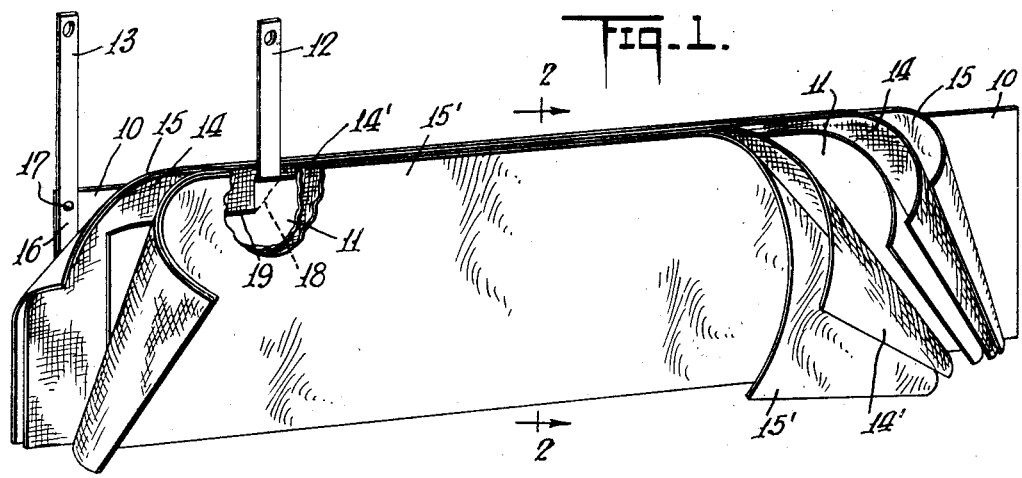
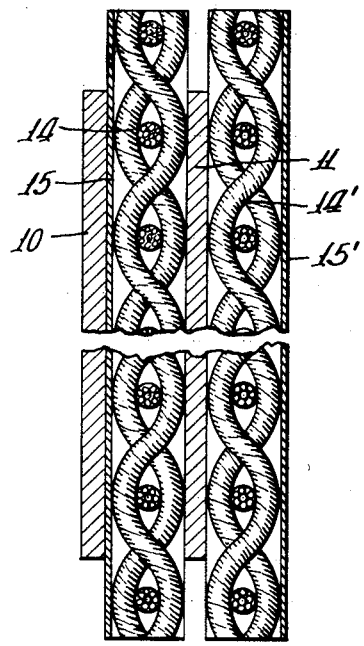
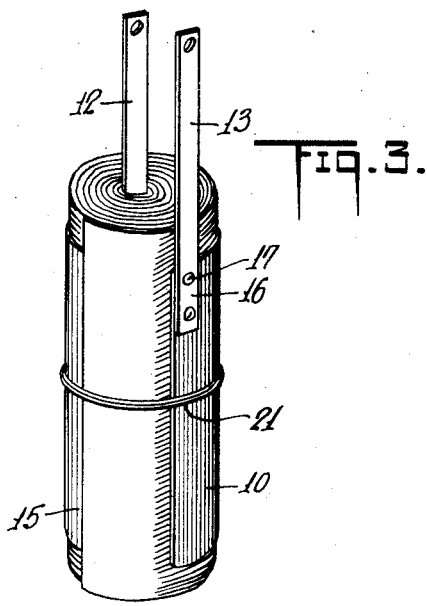
INVENTOR
*Alexander Georgiev*
BY
ATTORNEYS Nov. 9, 1937.  A. GEORGIEV  2,098,745
ELECTROLYTIC CONDENSER
Filed Sept. 2, 1932  2 Sheets—Sheet 2
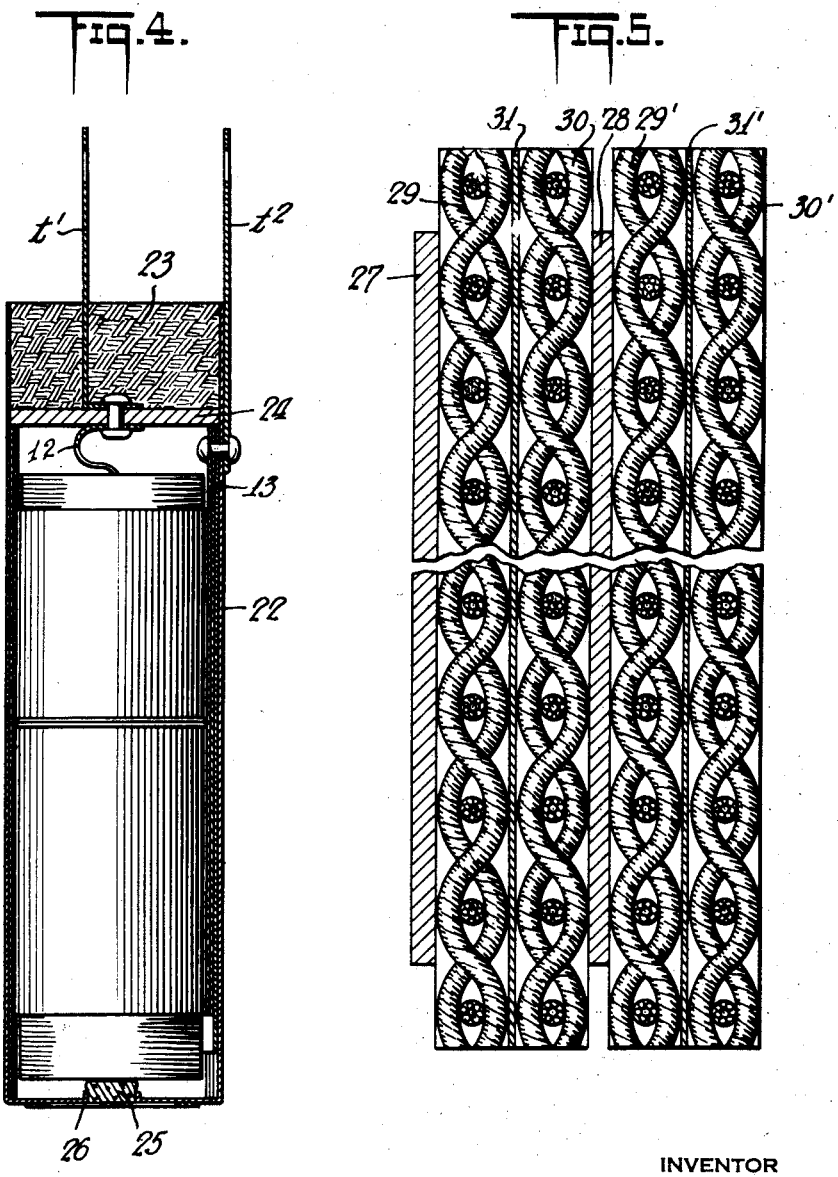
INVENTOR
*Alexander Georgiev*
BY
ATTORNEYS Patented Nov. 9, 1937

2,098,745

UNITED STATES PATENT OFFICE 2,098,745

ELECTROLYTIC CONDENSER

Alexander Georgiev, Brooklyn, N. Y., assignor to Aerovox Corporation, a corporation of New York Application September 2, 1932, Serial No. 631,479

12 Claims. (Cl. 175—315)

My present invention relates to electrolytic cells, more especially to electrolytic condensers.

An object of the invention is to provide a condenser of the above type capable of use on circuits of even 500 volts or more, which, though the constituent parts thereof are closely pressed together for compactness, is yet substantially proof against short-circuit.

Another object is to provide a condenser of the above type which shall be adapted to the use of extremely thin metal foil electrodes of thickness in the order of .001 inch.

Another object is to provide a condenser of the above type, so compact in construction as to render it suitable for use in the limited space afforded in modern radio receiving sets.

In the accompanying drawings in which are shown one or more of various possible embodiments of the several features of the invention, Fig. 1 is a perspective view showing the electrodes and interlay in coordinated relation but before winding;

Fig. 2 is a cross-sectional view on line 2—2 of Fig. 1, showing the thickness in greatly enlarged proportions;

Fig. 3 is a perspective view of the finished and enrolled condenser;

Fig. 4 is a sectional view showing one typical enclosure and terminal arrangement for the condenser; and Fig. 5 is a view similar to Fig. 2 of a modified form.

Referring now to the drawings there is shown in Figs. 1 and 2 a cathode foil 10 which is an elongated strip of aluminum and a similar foil 11 also of aluminum and serving as the anode.

These foils may be similar in character to those disclosed in my prior Patent, No. 1,789,949, granted July 20, 1931, though a preferred construction and arrangement of terminal tab 12, of the anode foil and of terminal tab 13 of the cathode foil will be more fully described below.

The interlay between the foils is composite and includes a layer of relatively open-texture fibrous material having high absorptive capacity for the electrolyte and additional protective means associated therewith to prevent short-circuiting contact between the two foils through the open texture of the interlay element.

For this purpose the interlay may include, in addition to an open mesh layer, a superposed sheet element of close texture and of relatively lesser thickness and lesser electrolyte absorptive capacity.

In a desirable embodiment the primary element of the composite interlay comprises a sheet 14 of gauze, which may be of mesh 40 x 44, and the additional element comprises a sheet 15 of close-texture paper.

In a preferred embodiment as shown on enlarged scale in Fig. 2, each of the aluminum electrode foils may be in the order of .001" in thickness, the gauze .006" in thickness and the paper interlay .0004" to .0005" in thickness.

Since in practice the anode is formed with a dielectric film on both faces thereof, it is preferred to place a layer of gauze 14' in contact with the outer surface of the anode, and superpose over the latter a layer of paper 15', similar to layers 14 and 15 respectively. The anode foil is thus sandwiched between two layers of gauze in which electrolyte is absorbed, and these layers of gauze with the intervening foil are in turn sandwiched between two layers of paper.

By the use of materials of the small thickness set forth, a condenser of relatively tremendous electrode area can be produced in an extremely small volume.

It is preferred to use as the electrolyte a solution of the general character of those described in my prior patent, No. 1,815,768 of July 21, 1931. Such solution is essentially liquid in character and becomes readily absorbed in the gauze interlay 14 and will also permeate the close texture paper interlay element 15, so that the conductivity between the electrodes is not adversely affected by the presence of the paper and the gauze.

Where extremely thin foils in the order of .001" are used, the terminal tabs 12 and 13 would be so weak as to require extremely careful handling to guard against tearing the same during assembly of the condenser in the can or other container. Accordingly these tabs are reinforced in manner shown and claimed in my co-pending application, Serial No. 569,926, filed October 20, 1931. Illustratively I have shown in the present embodiment a strip 16 of thicker aluminum stock extending across part of the width of the cathode foil and riveted thereto as at 17. The anode foil tab, illustratively .002" in thickness, admits of a unitary tab 12 formed by longitudinally slitting the foil at one end, as at 18, and obliquely folding the base of the tongue thus formed, as at 19.

The condenser is wound as best shown in Fig. 3 and held together by a rubber band 21 with the cathode foil at the exterior to serve as an electrostatic shield and a mechanical protector among other functions, and with the cathode and anode tabs protruding from the top.

In use, the paper absorbs but a small proportion of the electrolyte, the great bulk of which is absorbed by the gauze. The paper however absorbs sufficient of the electrolyte not to disturb the conductivity between the film on the anode and the metal of the cathode.

It is understood that the invention is not limited to the use of electrodes of extreme thinness or to the use of a paper interlay element of extreme thinness, but in its broader aspects the invention embraces the use of an electrolyte-holding interlay with special protective means, whether of paper or other material, whether separate or incorporated as an integral part of the open texture or gauze interlay and which without objectionably interfering with the conductivity of electrolyte between the two electrodes yet effectively prevents a short-circuit under the usual short-circuit-producing conditions through the open mesh of the gauze.

In present commercial practice I use an aluminum anode foil of .002" in thickness and aluminum cathode foil .0015" in thickness.

The roll may be encased in any of various conventional manners either in a paper box, but preferably in an aluminum can as in my prior Patent No. 1,789,949. Illustratively I have shown in Fig. 4 one mode of enclosing the condenser coil, which mode in itself is not part of the invention claimed herein. It is briefly noted that the formed roll with the electrolyte absorbed is enclosed in a can 22 without any further filling, the can being sealed at its top as by pitch 23, resting on a false top 24, and the terminals $t'$ and $t^2$ riveted respectively to the cathode and anode foil tabs 12 and 13 protrude from the upper end of the condenser.

Preferably a vent structure is provided as in the bottom of the can, including a plug of cork 25 frictionally fitting into an inturned opening 26, which cork serves as a safety plug to relieve any excessive gas pressure evolved in operation of the condenser. The cork plug does permit the accumulation of some gas pressure within the container during operation. This pressure is desirable in minimizing the evaporation of water from the electrolyte and in excluding the entry of excessive quantities of water vapor from the atmosphere, thereby to keep the aqueous content of the electrolyte substantially constant throughout operation, thus avoiding the variation in performance of the condenser otherwise incurred.

The vent structure is not claimed herein but is covered in my co-pending application Serial No. 576,473, filed November 21, 1931, now Patent No. 2,006,713.

It is noted that where the condenser has merely a single gauze interlay without the thin paper or equivalent protective agency, there is a greatly increased likelihood of short-circuit. Any imperfection of the foil, such as a wrinkled, sharp, ragged edge or other irregularity, may readily penetrate one or more of the meshes of the gauze. Any imperfection of the gauze itself may permit a direct contact between the two electrodes. Even where the gauze is in good condition, the tight winding of the electrodes to produce compactness of the structure might bring the foils so close together at one or more of the meshes of the gauze as to lead to short-circuit.

While an electrolytic condenser with a single gauze interlay will function as long as the conditions of operation are ideal or nearly ideal, departure from such condition of operation may lead to short-circuit, especially under high voltage operation. The use of the auxiliary paper interlay imparts to the condenser a high factor of safety under abnormal conditions of operation.

A condenser with two layers of gauze, while less subject to short-circuit than a unit with only a single layer of gauze, presents considerably more bulk as is immediately obvious, involves greater cost and does not lend itself so readily to the use of the extremely thin foil which is preferably employed. A thin foil more readily develops wrinkles which may establish a direct contact between the two electrodes when gauze is used, while paper of close texture prevents such contact even though the foils be wrinkled.

Where the condenser is intended for particularly high voltage and other severe operating conditions, rendering desirable a greater spacing between the electrodes and a supply of liquid electrolyte of greater volume than a single gauze can store, it is preferred to employ a double layer of gauze as best shown in Fig. 5, however with a thin sheet of paper between the two layers of gauze. In the cross-sectional view of Fig. 5 the electrodes are shown at 27 and 28, the two layers of intervening gauze at 29 and 30, and the intermediate layer of paper at 31. The double layer of gauze at the other face of the anode appears at 29' and 30', and the layer of paper intervening between said gauze layers, at 31'.

An interlay of paper alone without gauze has not been found as satisfactory as the use of gauze combined with paper, because such paper does not absorb enough electrolyte solution to insure long life to the condenser and dependable capacity and power factor. When subjected to the fairly high temperature of 120 to 140° F. frequently incurred in use of the condenser in radio receiving sets, the capacity would drop and the equivalent series resistance would rise due to loss of moisture from the electrolyte.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters Patent of the United States is:—

1. An electrolytic condenser comprising electrodes and a composite fibrous interlay interposed therebetween, said interlay including two superposed elements, one of relatively open mesh and high electrolyte-absorptive capacity and the other of close texture and lower electrolyte-absorptive capacity.

2. An electrolytic condenser comprising electrodes, a composite fibrous interlay interposed therebetween and including superposed elements, one of relatively high electrolyte-absorptive capacity and open texture and the other a thinner element of close texture and relatively low electrolyte-absorptive capacity.

3. An electrolytic condenser comprising electrodes, a gauze interlay therebetween and means permeable to electrolyte, engaging one of said electrodes and substantially preventing engagement between said electrode and said gauze.

4. An electrolytic condenser comprising electrodes and a composite fibrous interlay therebetween including a layer of gauze and a layer of thin paper of close texture.

5. An electrolytic condenser comprising superposed electrodes, a fibrous interlay therebetween, said electrodes and interlay enrolled to form a convolute unit, said interlay including two layers, one of relatively open mesh and higher electrolyte-absorptive capacity, the other of close texture and lower electrolyte-absorptive capacity.

6. An electrolytic condenser including elongated cathode and anode foils, an interposed layer of gauze, said elements enrolled to form a convolute condenser structure and means interposed between the gauze layer and one of said foils, pervious to electrolyte, and substantially preventing protrusion of the contiguous foil through any part of the gauze.

7. An electrolytic condenser comprising an anode foil, a layer of gauze and a layer of paper on one face of the anode, a similar layer of gauze and layer of paper on the other face of the anode, and a cathode foil, all in superposed relationship, said elements enrolled to form a convolute condenser structure.

8. An electrolytic condenser comprising electrodes of thickness in the order of .001", an interposed composite fibrous interlay including a layer of relatively open texture having relatively high electrolyte-absorptive capacity and a layer of close texture paper of lower electrolyte-absorptive capacity and of thickness in the order of .0005".

9. An electrolytic condenser including elongated cathode and anode foils of thickness each in the order of .001" and composite fibrous interlays on opposite faces of said anode foil, each comprising a fibrous sheet of relatively open texture and a sheet of paper of relatively close texture of thickness in the order of .0005", all of said elements being enrolled to form a convolute unit.

10. An electrolytic condenser including an anode and a cathode of aluminum foil, each of thickness in the order of .001", composite fibrous interlays on opposite faces of the anode foil, each including a layer of relatively open mesh gauze and a layer of relatively close mesh paper of thickness in the order of .0005" and an electrolyte absorbed in the composite interlay, said electrolyte being of mobile character.

11. An electrolytic condenser comprising an anode foil, electrolyte retaining gauze, covering the faces of said anode foil, paper covering the exposed faces of said gauze, and a cathode foil covering the exposed face of the paper at one side.

12. An electrolytic condenser comprising electrodes and a composite insulating interlay interposed therebetween, said interlay including two superposed sheet elements, one of relatively high electrolyte absorptive capacity serving as the major absorbent means for electrolyte and the other of lower electrolyte absorptive capacity serving as a protective means.

ALEXANDER GEORGIEV.